United States Patent [19]

Sunamori et al.

[11] 4,146,588
[45] * Mar. 27, 1979

[54] AEROBIC COMPOSITION CAPABLE OF POLYMERIZING UPON CONTACT WITH OXYGEN

[75] Inventors: Takashi Sunamori; Noboru Nishii, both of Otake, Japan

[73] Assignee: Mitsubishi Rayon Co., Ltd., Tokyo, Japan

[*] Notice: The portion of the term of this patent subsequent to Aug. 15, 1995, has been disclaimed.

[21] Appl. No.: 786,194

[22] Filed: Apr. 11, 1977

[30] Foreign Application Priority Data

Apr. 19, 1976 [JP] Japan .................. 51-44637

[51] Int. Cl.² .............. C08F 4/44; C08F 220/56; C08F 20/12; C08F 20/20
[52] U.S. Cl. .................. 260/875; 428/461; 428/463; 427/248; 526/91; 526/193; 526/201; 526/204; 526/218; 526/220; 526/222; 526/241; 526/287; 526/303; 526/306
[58] Field of Search .......... 526/91, 93, 94, 209, 526/211, 212, 303, 875; 260/79.3 MU; 427/340

[56] References Cited

U.S. PATENT DOCUMENTS

| 2,922,768 | 1/1960 | Mino | 260/79.3 MU |
|---|---|---|---|
| 3,002,956 | 10/1961 | Perri | 260/79.3 MU |
| 3,336,269 | 8/1967 | Monagle | 526/303 X |
| 3,563,963 | 2/1971 | Beier | 260/79.3 MU |

FOREIGN PATENT DOCUMENTS

| 1134513 | 8/1962 | Fed. Rep. of Germany | 526/91 |
|---|---|---|---|
| 37-13889 | 9/1962 | Japan | 526/91 |

Primary Examiner—C. A. Henderson
Attorney, Agent, or Firm—Oblon, Fisher, Spivak, McClelland & Maier

[57] ABSTRACT

An aerobic composition which comprises (A), (B), (C), (D) and (E) and which begins to polymerize upon coming in contact with oxygen, wherein said components are;

(A): at least one compound selected from (1) trivalent cerium compounds and (2) chelated trivalent cerium compounds, (B): when (A) is (1) a compound capable of forming a chelate with trivalent cerium ion and with tetravalent cerium ion and when (A) is (2), a compound capable of forming a chelate with tetravalent cerium ion, (C): at least one reducing sulfur compound capable of producing ions represented by $S_xO_y^=$, wherein x and y are integers such that $1 \leq x \leq 6$ and $1 \leq y \leq 7$, or $R_6SO_2^-$ ions, wherein $R_6$ is an alkyl group of 1-15 carbon atoms, $C_6H_5(CH_2)_n^-$ (wherein n is 1-3) or $Y-C_6H_4$ (wherein Y is H, $CH_3$, Cl, Br, CN, $CH_3O$, $C_2H_5O$, $CH_3CONH$, $NO_2$ or COOH), in the presence of water, (D): at least one polymerizable vinyl monomer having a molcular weight of not more than 1000, and (E): an aqueous medium capable of dissolving or dispersing said components (A)-(D).

9 Claims, 3 Drawing Figures

AEROBIC COMPOSITION CAPABLE OF POLYMERIZING UPON CONTACT WITH OXYGEN

BACKGROUND OF THE INVENTION

1. Field of the Invention

This invention relates to an aerobic composition capable of beginning to polymerize upon contact with oxygen and more particularly it relates to a film-forming composition.

2. Description of the Prior Art

Vinyl compounds are generally easy to handle and are easily converted to crosslinked polymers by the processes of photopolymerization, radiation-induced polymerization and the like. Hence, such vinyl compounds are utilized as fiber treating materials and coating materials for the decoration and protection of various materials such as metals, wood, stone, asbestos, and the like. However, the rate of the polymerization reaction is generally extremely low in these processes when oxygen is present in the polymerization system, due to the polymerization inhibition effect of oxygen. Consequently, it is very difficult to harden the vinyl monomers with crosslinking in air. Therefore, when these vinyl monomers are to be utilized as a coating material, a special apparatus for forming an inert gas atmosphere and large amounts of the inert gas are required for crosslinking and polymerizing the vinyl monomers to produce a protective film.

The apparatus and the inert gas are very expensive and industrial application of this method is difficult. Moreover, when the substrates to be coated are large articles such as bridges, ships, and the like, formation of coating films using these processes is practically impossible.

The present inventors have previously discovered that when water soluble or water dispersible vinyl monomers are polymerized in an aqueous medium, inhibition of polymerization due to oxygen in the air becomes less conspicuous. Moreover, an effective polymerization reaction can be performed using a polymerization initiator which comprises a mixture of at least one tetravalent cerium compound and a chelate-forming compound, or at least one chelated compound of tetravalent cerium, and at least one sulfur compound which produces ions represented by $S_xO_y^=$ (wherein x and y are integers, such that $1 \leq x \leq 6$ and $1 \leq y \leq 7$) in the presence of water. (See U.S. patent application Ser. No. 591,860, filed on June 30, 1975.)

However, according to this method, the polymerization or crosslinking reaction begins as soon as the vinyl monomers and the initiator are mixed. Therefore, the mixture cannot be stored as a one-pack type polymerizable composition, but rather, separate components must be mixed just before use. Because of this disadvantage, the development of applications in this field has been limited.

SUMMARY OF THE INVENTION

Accordingly, one object of this invention is to provide an aerobic polymerization composition which is stable in storage and which remains polymerizable when exposed to oxygen in the air, or which can begin to polymerize with oxygen present.

Another object of this invention is to make possible the polymerization and hardening of vinyl compounds in air to produce a coating film.

Still another object of this invention is to provide a crosslinking coating material of the vinyl compound type which can be polymerized in air and can be directly coated on a rusted surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
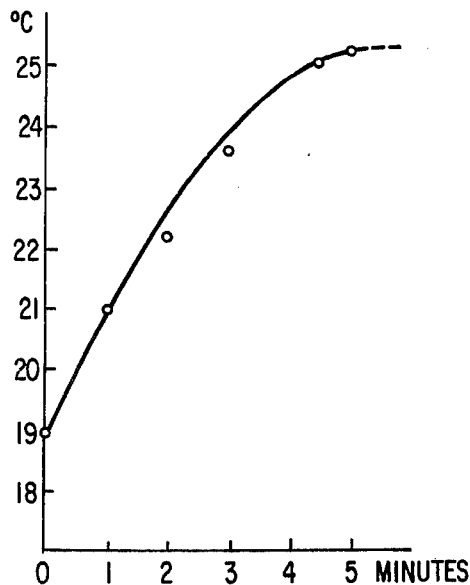
FIG. 1 is a graph for a composition of this invention which was prepared in air.

This invention is an aerobic composition which comprises components (A), (B), (C), (D) and (E) and which will begin to polymerize upon coming in contact with air. The components are:

(A): at least one compound selected from (1) trivalent cerium compounds and (2) chelated trivalent cerium compounds, (B): when (A) is (1) a compound capable of forming a chelate with trivalent cerium ion and with tetravalent cerium ion and when (A) is (2), a compound capable of forming a chelate with tetravalent cerium ion, (C): at least one reducing sulfur compound capable of producing ions represented by $S_xO_y^=$, wherein x and y are integers such that $1 \leq x \leq 6$ and $1 \leq y \leq 7$, or $R_6SO_2^-$ ions, wherein $R_6$ is an alkyl group of 1–15 carbon atoms, $C_6H_5(CH_2)_n^-$ (wherein n is 1–3) or Y-$C_6H_4$ (wherein Y is H, $CH_3$, Cl, Br, CN, $CH_3O$, $C_2H_5O$, $CH_3CONH$, $NO_2$ or COOH), in the presence of water, (D): at least one polymerizable vinyl monomer having a molecular weight (number average molecular weight measured by using a freezing point depression method) of not more than 1000, and (E): an aqueous medium capable of dissolving or dispersing said components (A)–(D).

Suitable polymerizable vinyl monomers of components (D) include: acrylates or methacrylates having an alkyl group of 1–18 carbon atoms such as methyl acrylate or methacrylate, ethyl acrylate or methacrylate, n-propyl acrylate or methacrylate, isopropyl acrylate or methacrylate, n-butyl acrylate or methacrylate, isobutyl acrylate or methacrylate, t-butyl acrylate or methacrylate, etc; or acrylamide or methacrylamide; or acrylic or methacrylic acid, itaconic acid, crotonic acid, α-methyleneglutaric acid, p-vinylbenzene-sulfonic acid, 2-sulfoethyl acrylate or methacrylate, 2-acrylamide-2-methylpropanesulfonic acid or 2-methacrylamide-2-methylpropanesulfonic acid and potassium, sodium or ammonium salts of these acids; diallyl-dimethyl ammonium bromide; methylenebis acrylamide or methacrylamide; compounds represented by the formula:

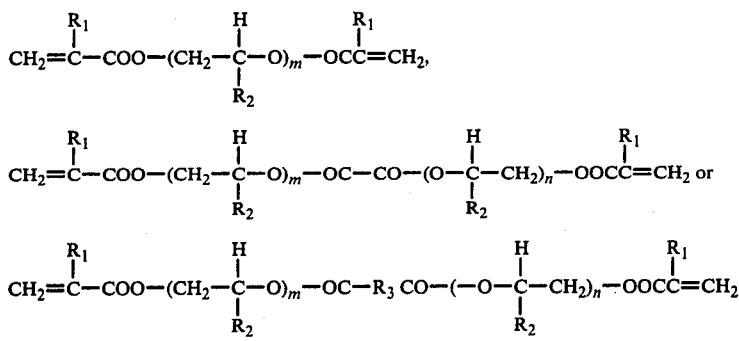

(wherein $R_1$ and $R_2$ are H or $CH_3$, $R_3$ is an alkylene group of 1–10 carbon atoms,

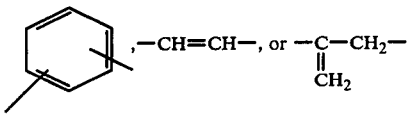

and m and n are integers of 1–10); glycerin mono-, di-, or tri-acrylate or methacrylate, trimethylolpropane mono-, di-, or tri-acrylate or methacrylate, pentaerythritol mono-, di-, tri-, or tetra-acrylate or methacrylate, di-trimethylol propane di- or tetra-acrylate or methacrylate, dipentaerythritol di- or hexa- acrylate or methacrylate, acryloyl or methacryloyl compounds of N-methylol- or N-alkylolbenzoguanamine, acryloyl or methacryloyl compounds of N-methylol- or N-alkylol melamine, styrene, divinylbenzene, unsaturated polyesters, and the like.

Vinyl compounds which are only slightly soluble in water, for example, acrylates or methacrylates having alkyl group of 5–18 carbon atoms, styrene, divinylbenzene, unsaturated polyesters, and the like may be used as a constituent of component (D), in which case, they should be added in such an amount as not to reduce the solubility or dispersibility of said water-soluble or water-dispersible vinyl compounds. Preferably additives such as solvents which increase the water solubility or water dispersibility of these vinyl compounds are used.

The vinyl compounds used in this invention have a molecular weight of 1000 or less. Therefore, the viscosity of the composition is very low and the composition can easily fill a porous body having a microstructure, and for example, can easily penetrate into rusted areas of a metal. Since the composition of this invention can be easily polymerized and hardened in an atmosphere in which oxygen is present, when this polymerization-hardening composition is applied as a coating material on a rusted metal, a film is formed which sufficiently penetrates the inside structure of the rust to efficaceously prevent further rusting.

Suitable media (E) which dissolve or disperse the components (A)–(D) used in practicing this invention include water or an aqueous mixed solvent comprising water and water soluble organic solvents such as methanol, ethanol, isopropanol, ethylene glycol monoalkyl ether and the like or said aqueous medium to which water soluble or water dispersible polymers are added. Specific examples of the water soluble or water dispersible polymers used herein include resins such as vinyl resins, e.g., acrylic resins, vinyl acetate resin, and vinyl acetate-ethylene copolymer, aminoalkyd resins, oil free-alkyd resins, maleinized polybutadiene resins or salts of these resins, preferably those resins having an acid value of 5–300, especially 30–200. These resins, for example, can be dispersed in an aqueous medium using an emulsifier.

When the polymerizable monomers in the composition of this invention begin to polymerize to form a crosslinked polymer in an atmosphere containing oxygen, e.g., in air, the resin contained in the aqueous medium is incorporated into the network structure of the gel polymer consisting mainly of component (D). A continuous structure is formed which contributes to an improvement in the flexibility, shock resistance, etc. of the gel-like material. These advantages are especially significant when said gel-like material is utilized as a coating film.

Suitable compounds capable of forming a chelate with a trivalent or tetravalent cerium ion, and which constitute component (B) include $\beta$-diketones such as acetylacetone, diisobutyrylmethane, dipivaloylmethane, benzoylacetone, dibenzoylmethane, trifluoroacetylacetone, methacroylacetone, and the like; ketoesters such as ethyl acetoacetate, and the like; 8-hydroxyquinoline; and tropolone. Such compounds capable of forming a chelate are not limited to such low molecular weight compounds and may include polymers or copolymers having a functional group with chelate-forming ability. Starting materials for preparation of such chelate-forming polymers include, for example, compounds represented by formulas (II′) and (III′);

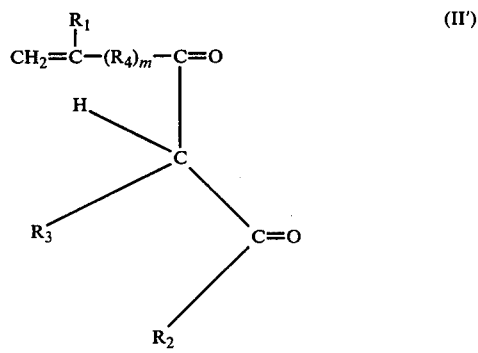

(wherein $R_1$ is a hydrogen atom, a methyl group or a carboxyl group; $R_2$ is an alkyl group of 1–8 carbon atoms, a cycloalkyl group of 5–8 carbon atoms, an alkoxy group of 1–8 carbon atoms, a phenyl group, or a tolyl group; $R_3$ is H, F, Cl, Br, I, CN, an acetyl, propionyl or benzoyl group or an alkyl group of 1–2 carbon atoms; R₄ is —CH₂—, —O—, —C₆H₄— or —C₆H₄CH₂—; and m is an integer such that $0 \leq m \leq 2$).

(III')

(wherein R₁ is defined as above and X is an ester group, a nitrile group, an amide group, —(CH₂)ₘ—COOR₅ (wherein m is defined as above and R₅ is a hydrogen atom, an alkyl group of 1–18 carbon atoms, a phenyl group, Y—C₆H₄— (wherein Y is p-, o- or m-CH₃, p- or o- CH₃O, p- or o-Cl, p- or o—NO₂) or C₆Cl₅), a phenyl group, Z—C₆H₄— (wherein Z is p-, o- or m-CH₃, C₂H₅, CH₃O, C₂H₅O, NH₂, F, Cl, Br, I, NO₂, CN, OH, C₆H₅), (CH₃)₂C₆H₃, (C₂H₅)₂C₆H₃, F₂C₆H₃, Cl₂C₆H₃ or Br₂C₆H₃, a halogen, an ether group, a carboxyl group, an aminoalkyl group or a sulfoalkyl group).

Specific examples of the compounds represented by the formula (II') are acroylacetone or methacroylacetone itself or substituted with said R₁, R₂, R₃ and R₄. Specific examples of the compounds represented by the formula (III') are alkyl acrylates or methacrylates such as methyl acrylate or methacrylate, ethyl acrylate or methacrylate, propyl acrylate or methacrylate, and the like; benzyl acrylate or methacrylate; hydroxyalkyl acrylates or methacrylates such as hydroxyethyl acrylate or methacrylate, hydroxypropyl acrylate or methacrylate, hydroxyhexyl acrylate or methacrylate, hydroxybenzyl acrylate or methacrylate, and the like; aminoalkyl acrylates or methacrylates such as N, N-dimethylaminoethyl acrylate or methacrylate, N,N-diethylaminoethylacrylate or methacrylate and the like; sulfoalkyl acrylates or methacrylates such as 2-sulfoethyl acrylate or methacrylate, sulfopropyl acrylate or methacrylate, and the like, glycidyl ester compounds such as glycidyl acrylate or methacrylate, methlglycidyl acrylate or methacrylate, and the like; acrylonitrile or methacrylonitrile; acrylamides or methacrylamides such as acrylamide or methacrylamide, N-methyl acrylamide or methacrylamide, N,N-dimethyl acrylamide or methacrylamide, N-methoxymethyl acrylamide or methacrylamide, and the like; vinyl esters such as vinyl acetate, and the like, styrene derivatives such as styrene, α-methylstyrene, o, m, p-methylstyrene, and the like; vinylbenzenesulfonic acid; acrylic or methacrylic acid; itaconic acid, itaconic acid esters such as monomethyl itaconate, and the like; allylamine; acrylylsulfonic or methacrylylsulfonic acid and the like. These chelate-forming compounds of component (B) are used preferably in an amount which represents an excess relative to the amount of cerium present.

The trivalent cerium compounds which constitute component (A) of the composition of this invention are preferably those which alone exhibit water solubility or those which combine with the chelate-forming compounds to exhibit water solubility. Suitable compounds include salts such as nitrates, sulfates and acetates of trivalent cerium or halides such as the iodide, bromide and chloride of trivalent cerium. Suitable chelated trivalent cerium compounds are those obtained by the reaction of said trivalent cerium compounds and the chelate-forming compounds which constitute component (B) in an atmosphere in which no oxygen is present. When the preparation is carried out in the presence of oxygen, the trivalent cerium is oxidized to tetravalent cerium. Hence, compounds prepared in the presence of oxygen cannot be used as component (B) in the aerobic composition since the composition will begin to polymerize even if it is stored in an inert gas. One example of the preparation of a chelate polymer using a polymer as chelate ligand is as follows.

The compound represented by formula (II') alone or a mixture of the compounds represented by formulas (II') and (III'), in ratios determined conventionally, according to the intended use, is polymerized by known methods for polymerization of vinyl compounds to obtain either a polymer having only the repeating unit represented by formula (II) or a polymer having repreating units represented by both formula (II) and formula (III).

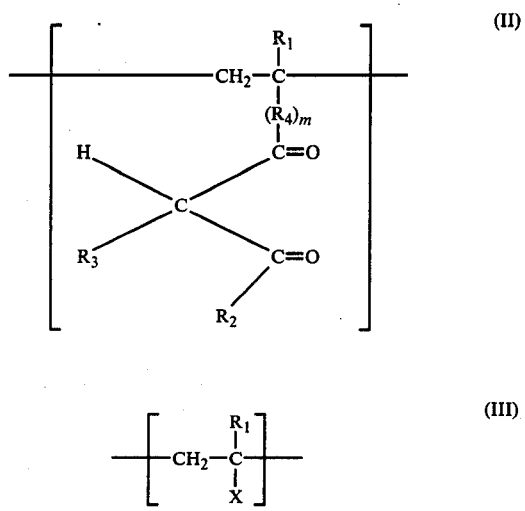

(wherein R₁, R₂, R₃, R₄ and R₅ are defined as above, for formulas II' and III'). Thereafter, the thus obtained polymer containing β-diketone structures as functional groups is reacted with a cerium salt in a polar solvent such as dioxane, in which said functional group can react with the cerium ion, to give the chelated trivalent cerium compound of component (A) used in this invention. Said chelated trivalent cerium compound will contain repeating units of formula I, wherein R₁, R₂, R₃, R₄ and R₅ are defined as for formula II', and may also contain repeating units of formulas II and III.

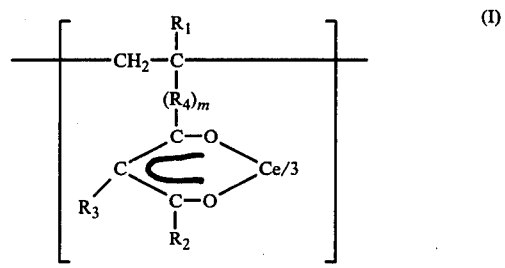

As mentioned hereinbefore, the reaction of said polymer and said cerium salt in the polar solvent must be performed in an oxygen-free atmosphere.

The chelated compound of trivalent cerium used in this invention, e.g., a trivalent cerium acetylacetonato compound is converted to a chelated tetravalent cerium compound in an atmosphere containing oxygen according to the following reaction and can then act as a polymerization or crosslinking catalyst for polymerizable vinyl monomers.

+CH₃COCH₂COCH₃

+O₂

Ce(CH₃COCHCOCH₃)₃ →
Ce(CH₃COCHCOCH₃)₄

It can be seen from the above equation that, even when a trivalent chelated cerium compound with three acetylacetonato-type ligands is used as component (A), it is necessary for the chelate-forming compound of component (B) to be present in order to utilize the composition of this invention, since it provides the fourth ligand for the tetravalent cerium compound resulting from the reaction with oxygen.

When chelate polymer of trivalent cerium is used as component (A), it is spontaneously oxidized in the presence of oxygen to a polymer containing a tetravalent cerium chelate structure to considerable extent. This is supported by the fact that the chelate polymer is colored reddish-brown and can be identified by measurement of its infrared absorption spectrum, or its ultraviolet or visible absorption spectrum. In the presence of a reducing compound capable of producing $S_xO_y^=$ ions or $R_6SO_2^-$ ions in the presence of water, said reddish-brown polymer produced in the presence of oxygen and containing largely the tetravalent cerium chelate structure is converted back into a chelate polymer containing the trivalent cerium chelate structure and at the same time initiates the polymerization reaction of the polymerizable vinyl compounds.

As mentioned above, the cerium of the trivalent cerium chelate polymer is converted from a trivalent to a tetravalent state in an atmosphere containing oxygen and this change is the essential requirement for obtaining polymerization initiating ability. Since the cerium is converted from six-coordinate structure to eight-coordinate structure during the oxidation, cerium chelate polymer containing the repeating unit of formula (II) in its structure is preferred because said conversion proceeds more easily. Furthermore, the cerium chelate compound should contain at least 3% by weight of the unit represented by formula (I). When the content of said unit is less than 3% by weight, the catalytic efficiency of the chelate polymer used as a polymerization catalyst for vinyl compounds is extremely low and this is not preferred. On the other hand, a content of said unit of more than 90% by weight is not preferred because the conversion of cerium ion from a trivalent to a tetravalent state or from a tetravalent to a trivalent state in the repeating unit of formula (I) does not proceed smoothly. Therefore, the content of the repeating unit of formula (I) in the chelate polymer is preferably 3–90% by weight and that of the repeating unit represented by the formula (II) is preferably 7–90% by weight.

The structural unit represented by formula (III) is a component capable of imparting to the cerium chelate polymer various specific characteristics, such as hydrophilic or hydrophobic properties, hardness, swelling ability, and the like. These specific characteristics may be provided by copolymerizing the compounds represented by formula (III') into the structure of the chelate polymer in an optional amount of up to 90% by weight according to the intended use of the cerium chelate polymer.

Component (C) of the composition of this invention is a sulfur compound capable of producing ions represented by the formula $S_xO_y^=$ (wherein x and y are integers such that $1 \leq x \leq 6$ and $1 \leq y \leq 7$) or $R_6SO_2^-$ ions in an aqueous medium. This may be a gaseous compound, a solid compound or a liquid compound. Suitable sulfur compounds include, SO, SO₂, S₂O, sulfoxylic acid, sulfurous acid, dithionous acid, pyrosulfurous acid, pyrosulfuric acid, dithionic acid, trithionic acid, tetrathionic acid, pentathionic acid, hexathionic acid and sodium salts, potassium salts, and ammonium salts of said acids, sulfuryl chloride, dichloromonosulfane, dichloropolysulfanes such as dichlorodisulfane, dischlorotrisulfane, dichlorotetrasulfane, dichloropentasulfane, dichlorohexasulfane, dichlorooctasulfane, and the like; sulfinic acids such as benzenesulfinic acid, p-toluenesulfinic acid, butane sulfinic acid, dodecanesulfinic acid and sodium salts, potassium salts and ammonium salts of these acids.

Component (E) of the composition of this invention may contain an electron-pair donating compound. Examples of these electron-pair donating compounds are ammonia, organic amines such as methylamine, diethylamine, triethylamine, benzylamine, piperidine, monoethanolamine, diethanolamine, triethanolamine, 1,2-diaminoethanol, laurylamine, N,N,N', N'-tetramethyldiaminoethane, pyridine, dipyridyl, 1, 10-phenanthroline, amides such as N, N-dimethylformamide, sulfoxides such as dimethylsulfoxide, phosphineoxides such as trimethylphosphineoxide, hexamethylphosphoric triamide, and the like. When the composition of this invention to which these electron-pair donating compounds are added is exposed to oxygen, an interaction is believed to occur between the chelated cerium compound and the electron-pair donating compound which further accelerates the polymerization and crosslinking reaction of the composition of this invention. The theoretical mechanism for the formation of the gel polymer according to the present invention is not clear. However, it is believed that the gel polymer according to the present invention is produced as follows. When the composition of this invention comes in contact with oxygen, the trivalent cerium compound is easily converted into a tetravalent cerium compound with the help of the chelate forming agent. Then said tetravalent cerium compound reacts with $S_xO_y^=$ or $R_6SO_2^-$ to thereby produce a polymerization catalyst system capable of initiating and accelerating the polymerization and crosslinking reaction of vinyl monomers. Therefore, the composition of this invention has the highly advantageous characteristic that it begins to polymerize only when it comes in contact with oxygen.

The compound of component (B) which can produce a chelate with trivalent cerium in component (A) also plays an important role as a promotor for the conversion of said cerium from a trivalent to a tetravalent state. If said compound is not contained in the composition, the polymerization reaction of the composition in the presence of oxygen is markedly inhibited. Furthermore, said chelate-forming compound produces a chelate with the cerium compound, which increases the stability of the cerium compound in an aqueous medium, whereby said chelated cerium compound can be present in a stable form even if various impurities such as rusts of metals are present in the composition. Thus, no modification or reduction of water solubility is caused by the presence of these impurities, which could be a problem with non-chelated cerium salts. Moreover, the ability of the chelated cerium salts to act as a polymerization catalyst in the presence of oxygen is not impaired.

Furthermore, when the composition of this invention is exposed to oxygen, the trivalent cerium compound is converted into tetravalent cerium compound concommitant with initiation of polymerization of the polymerizable vinyl monomers. The tetravalent cerium is immediately reduced back to trivalent cerium, which, upon coming in contact with more oxygen, is again oxidized to the tetravalent chelated cerium compound and again exhibits catalytic action. Therefore, when used in the presence of oxygen, the cerium compound in the composition of this invention can act as a recycling catalyst which can effectively accelerate the polymerization of the vinyl monomers even in the low concentration of about 5–50,000 ppm of cerium ion relative to the amount of the vinyl monomers.

When the cerium compound used in such a method is of low molecular weight, disadvantages may result, namely that said cerium compound used in the polymerization reaction system would be homogeneously dispersed in the polymer and hence its recovery would be difficult, making recycling of the compound difficult as well. Furthermore, since the cerium compound would be homogeneously dispersed in the polymer and diluted, its efficiency as a polymerization initiator could not be increased except by adding said chelated cerium compound to the polymerization system in large amounts. On the other hand, when a cerium chelate polymer is used, a polymer solution or dispersion can be continuously obtained from the polymerizable vinyl monomers by controlling the affinity of said cerium chelate polymer for the medium and by increasing its bulk as much as possible. For example, an aqueous solution of polymer of the vinyl monomers can be continuously produced by passing an aqueous solution of water soluble polymerizable vinyl monomers, a reducing sulfur compound and oxygen through a column in which granular cerium chelate polymer is packed.

Furthermore, when repeating units of formula (III), having hydrophobic groups such as $-(CH_2)_mCOOR_5$ (wherein m is 0 and $R_5$ is an alkyl group of 1–18 carbon atoms or a substituted phenyl group) or unsubstituted or substituted phenyl as X, make up a part of the structural units of the cerium chelate polymer, the hydrophobic property of said polymer as a polymerization initiator can be further increased and its catalyst activity can be made weaker. Moreover, when said polymer is insoluble, it can be separated from the resultant vinyl polymer after use as a polymerization initiator for vinyl compounds and can be repeatedly used as a polymerization initiator.

It is a significant advantage that the polymerization reaction rate of the vinyl compounds in the composition of this invention is much higher than that of the vinyl compounds using a persulfate, which is conventionally used as a polymerization initiator for vinyl compounds in an aqueous medium. Further advantages of this invention are that the composition may be used for preparing aqueous solution polymers or emulsion polymers of all polymerizable vinyl compounds, that various crosslinked polymers and copolymers can be produced depending on the combination of the vinyl monomers, and that this polymerization reaction of said vinyl compounds can proceed at room temperature. Most importantly, since the presence of oxygen is essential for forming the polymerization catalyst system, as mentioned above, the polymerization reaction proceeds even in the presence of oxygen.

A method is known which comprises adding to an aqueous solution of acrylamide, prepared by hydration of acrylonitrile using a copper-containing catalyst, a chelate compound of tetrakis (acetylacetonato) cerium (IV) or the like and polymerizing the acrylamide in the absence of oxygen. (Said composition is similar to the composition of this invention.). However, when said method is applied to acrylamides prepared by other processes, polymerizability of the acrylamides is markedly decreased and the desired polyacrylamides cannot be obtained. Furthermore, if oxygen is present in the polymerization system, the polymerization reaction is markedly inhibited due to the effect of oxygen. On the other hand, the composition of this invention exhibits no such disadvantage when oxygen is present. Thus, the composition of this invention represents a significant improvement over the prior art.

In order for the composition of this invention, which begins to polymerize upon coming in contact with oxygen, to be stored in an unpolymerized state, the atmosphere in which it is preserved must comprise compounds which are inert and gaseous at room temperature. The simplest method for forming such an inert atmosphere is to utilize nitrogen, carbon dioxide, argon, krypton, freon, ethylene and the like.

The composition of this invention is an aqueous composition which may freeze at low temperatures. Freezing may be avoided by adding water soluble antifreezes such as ethylene glycol and the like.

The composition of this invention may be stored in cans or tanks, but it is convenient to package it in a spray can and to utilize it as a spray type coating material.

The advantages of the composition of this invention are most apparent when it is used as a coating material. The composition of this invention can be utilized for decorative finishing or protective finishing not only of polished metallic materials and chemically treated metallic materials, but also rusted metallic materials, stone, wood, asbestos, fibers, papers, and the like.

It is also one of the advantageous characteristics of this invention that, when the composition containing an aqueous polymer is used for producing a coating film as mentioned above, said aqueous polymer is incorporated into the crosslinked network structure of the coating film which is formed from the vinyl compounds to form a compact structure and, moreover, said aqueous polymer also forms a continuous structure, whereby a crosslinked structure with improved flexibility and shock resistance of the film can be produced. These advantages can be most clearly appreciated when the composition is used in coating applications where crosslinking curing reactions in the air are required, e.g., for use as repair coating materials for tall buildings, bridges, and the like. In addition, the composition of this invention can be utilized as a primary protective material, such as a gap filler, a bonding agent, an adhesive and the like.

Figure 2:
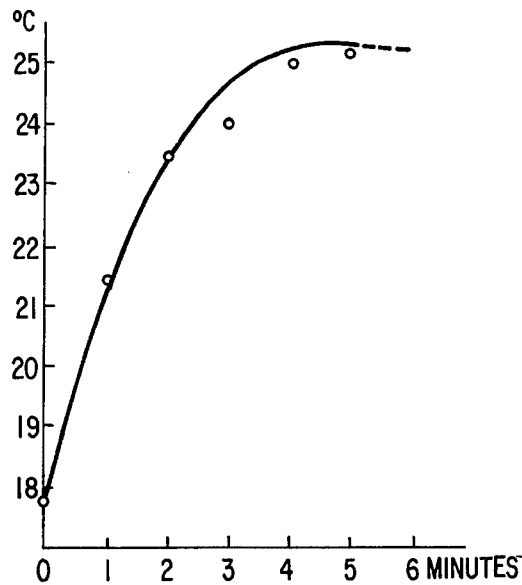
FIG. 2 is a graph for a composition of this invention which was prepared while air was continuously bubbled into the reaction system.
Figure 3:
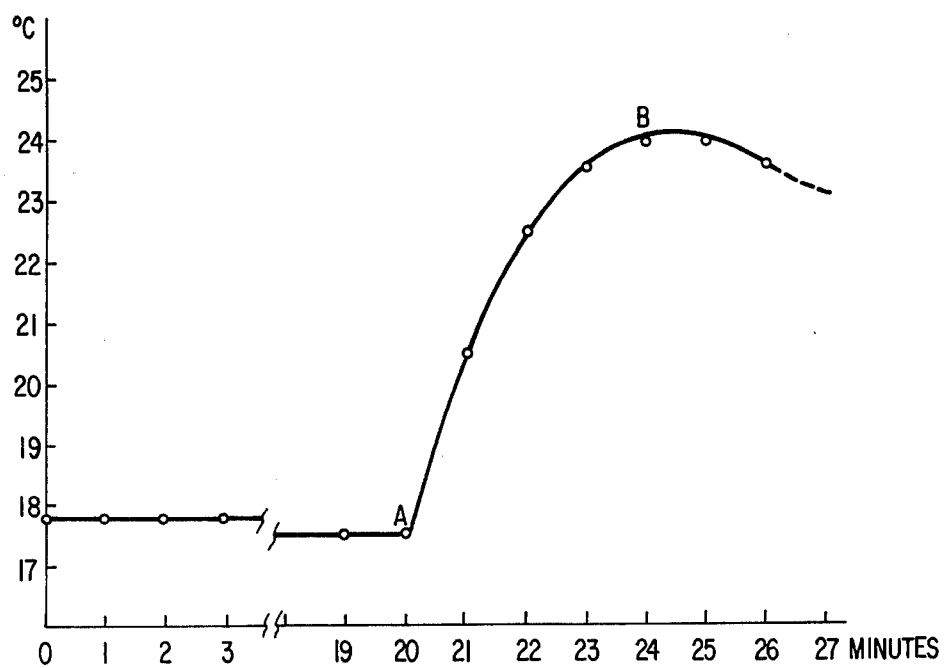
FIG. 3 is a graph for a composition of this invention which was prepared in a nitrogen atmosphere; then after 20 minutes had elapsed (Point A), bubbling of air into the system was begun; and after 24 minutes had elapsed (Point B), the bubbling of air was stopped.

FIGS. 1–3 are graphs which show the relation between the temperature of the composition and the total amount of time elapsed from the moment the composition of this invention was allowed to come in contact with air. An increase in the temperature of the composition was caused by the heat generated as polymerization proceeded.

Having generally described this invention, a further understanding can be obtained by reference to certain specific examples which are provided herein for purposes of illustration only and are not intended to be limiting unless otherwise specified.

EXAMPLE 1

An aqueous monomer solution containing compounds (1)–(5) shown in Table 1 was prepared in air at room temperature.

Table 1

| Composition of the monomer solution | |
|---|---|
| (1) Acrylamide | 1.0 g |
| (2) Water | 10.0 ml |
| (3) Pyridine | 0.15 ml |
| (4) Acrylic acid | 0.15 ml |
| (5) Acetylacetone | 0.20 ml |
| (6) Ce(NO$_3$)$_3$ . 2NH$_4$NO$_3$solution (*) | 0.20 ml |
| (7) Na$_2$SO$_3$ solution (**) | 1.0 ml |

(*)0.05 M. in 1 N HNO$_3$
(**)5% aqueous solution

The resultant solution was placed in a flask which was open to the air and in which a thermometer was inserted and solution (6) in Table 1 was added thereto and well stirred, after which solution (7) was added to obtain the composition of this invention. Simultaneous with the addition of solution (7), elevation of the temperature of the composition was observed and thus initiation of the polymerization reaction of the vinyl monomer was recognized. The variation in temperature of this solution for the time period following initial mixing is shown in FIG. 1.

EXAMPLE 2

Into a solution containing compounds (1)–(5) in Table 1 prepared in the same manner as in Example 1 was bubbled air at room temperature sufficient to dissolve therein. While air was further bubbled thereinto, solution (6) in Table 1 was added and well stirred, after which solution (7) was added to prepare the composition of this invention. Simultaneous with the addition of solution (7), elevation of the temperature of the composition was observed and thus initiation of the polymerization reaction of the vinyl monomer was confirmed. The variation in temperature of this solution during the time period following initial mixing is shown in FIG. 2. Comparison of FIG. 1 and FIG. 2 shows that the initial temperature rise was sharper when air was bubbled into the solution than when no air was bubbled into it. This can be understood in terms of an increased amount of oxygen coming in contact with the composition of this invention in the case where air is bubbled into the solution.

EXAMPLE 3

A solution containing compounds (1)–(5) in Table 1 and prepared in the same manner as in Example 1 was placed in a flask and nitrogen gas was bubbled therein sufficient to flush the solution and the flask with nitrogen. While continuing to bubble nitrogen gas therein, solution (6) in Table 1 was added and well stirred, after which solution (7) was added in order for the composition of this invention to be produced. This composition was kept in a nitrogen gas atmosphere. During a period of 20 minutes, no increase of temperature was observed and no polymerization reaction was initiated. When air was bubbled into this solution, an increase in the temperature of the solution was observed starting 10 seconds from the time the bubbling of air was begun, thus confirming that the polymerization reaction of the vinyl monomer was initiated immediately after air was let in. The variation in temperature of the solution during this time period is shown in FIG. 3, wherein point A represents the time at which bubbling of air was begun and point B represents the time at which bubbling of air was discontinued.

Comparative Example 1

A monomer solution was prepared in a nitrogen atomsphere in the same manner as in Example 3 except that a 0.05 M. solution of Ce(NO$_3$)$_4$.2NH$_4$NO$_3$ in 1 N HNO$_3$ was used as solution (6) instead of the cerium (III) solution of Table 1. Polymerization was immediately initiated and the yellow color of the Ce(IV) ion disappeared. Thus, it was confirmed that colorless and transparent polymer solution was obtained and at the same time the tetravalent cerium compound was reduced to a trivalent cerium compound. As can be seen, a tetravalent cerium composition such as the composition in this Example cannot be stably stored even in a nitrogen atmosphere.

EXAMPLE 4

To the solution obtained after termination of the reaction in Comparative Example 1 was added compound (1) in Table 1 in a nitrogen atmosphere to obtain the composition of this invention. Reaction did not occur at this point. When air was bubbled into this solution, the solution immediately turned yellowish-brown and its temperature rose. Thus, it was confirmed that polymerization of the vinyl monomer was initiated. When the bubbling of air in this solution was stopped, the solution gradually decolorized, but when air was again blown therein, the solution again turned yellowish-brown and its temperature again rose. The phenomenon could be repeated until polymerization of the vinyl monomer was complete.

EXAMPLE 5

The composition of this invention was prepared in the same manner as in Example 3 except that a 0.05 M. solution of Ce$_2$(SO$_4$)$_3$ in 1 N H$_2$SO$_4$ solution was used instead of Ce(NO$_3$)$_3$.2NH$_4$NO$_3$ solution. Then, air was bubbled into this solution and the polymerization reaction of the vinyl monomer was inititated.

EXAMPLE 6

The composition of this invention was prepared in the following manner, in a nitrogen atmosphere throughout. 10.8g of Ce(NO$_3$)$_3$.6H$_2$O was dissolved in 26 ml of 2.8 N HNO$_3$. Separately, 12.7 ml of distilled acetylacetone was dissolved in 36 ml of 2 N ammonia water and the resultant solution was added to said Ce(NO$_3$)$_3$ solution. When with stirring, 2 N ammonia water was added to raise the pH to 6, immediately a pale yellow precipitae was obtained. This precipitate was filtered off, washed with water several times and dried to obtain the chelate compound Ce(CH$_3$COCHCOCH$_3$)$_3$. The composition of this invention was then prepared in the same manner as in Example 3 except that 10 mg of Ce(CH$_3$COCHCOCH$_3$)$_3$ obtained above was added and dispersed in place of solution (6) in Table 1. When air was bubbled into this composition, the same polymerization behavior as in Example 3 was observed.

EXAMPLE 7

The compositions of this invention were prepared in the same manner as in Example 6 except that the chelate compounds as shown in Table 2 were used in place of Ce(CH$_3$COCHCOCH$_3$)$_3$ and these were stored for one month to show that the viscosity of the composition did not increase and the composition was stable. When air was bubbled into these compositions, the temperature rose and thus initiation of polymerization was confirmed.

Table 2

| $Ce(CH_3COCHCOC_6H_5)_3$ | $Ce(C_6H_5COCHCOC_6H_5)_3$ |
| --- | --- |
| $Ce(CF_3COCHCOCH_3)_3$ | |
| $Ce(CH_3COCHCOCH=CH_2)_3$ | (quinolin-8-olate cerium chelate structure) |

EXAMPLE 8

Eleven compositions of this invention were prepared in the same manner as in Example 3 except that the sulfur compounds shown in Table 3 were used in place of $Na_2SO_3$ and these compositions were stored for one month to show that they were stable. When air was bubbled into these compositions, polymerization of vinyl monomer was immediately initiated.

Table 3

Ammonium sulfite, ammonium bisulfite, sodium bisulfite, sodium dithionite, sodium pyrosulfite, sodium hydrosulfite, sodium metabisulfite, sodium benzenesulfinate, potassium sulfite, potassium bisulfite, sodium tetrathionate

EXAMPLE 9

98 ml of an aqueous solution of a monomer mixture having an acrylamide concentration of 0.99 M and N,N'-methylenebisacrylamide concentration of 0.01 M was prepared in a nitrogen atmosphere. To this aqueous solution were added solutions (3)–(7) shown in Table 1 and these were well mixed to obtain the composition of this invention, which was kept in a nitrogen atmosphere. When this composition was spray coated on a steel plate having reddish brown rust spots and this steel plate was left to stand in the air, gelation immediately occurred and the coating film was hardened in several minutes. Hardenability of the coating film was good and it was observed that the coating film penetrated well into the steel when the film was scraped by a knife after it had dried.

EXAMPLE 10

An aqueous composition of this invention having a pH of 6.5 was prepared in the same manner as in Example 9 except that triethanolamine was substituted for pyridine. When the composition was coated on a rusted steel plate and this plate was left to stand in the air, a good coating film was formed on the steel plate.

EXAMPLE 11

37 parts of dodecyl methacrylate, 26 parts of styrene, 12 parts of 2-hydroxyethyl methacrylate, 15 parts of N-butoxymethylacrylamide and 4 parts of itaconic acid were polymerized in 79 parts of isopropanol. To 100 parts of thus obtained copolymer solution was added 3 parts of β-dimethylaminoethanol to neutralize the solution.

To 3000 parts of thus obtained neutralized resin solution was added 750 parts of red oxide and these were mixed in a ball mill for 24 hours. The mixture was diluted to 5 times its original volume with water.

In 100 ml of the thus obtained aqueous resin solution containing red oxide were dissolved monomers so that the acrylamide concentration was 0.99 M and N,N¹-methylenebisacrylamide concentration was 0.01 M. To the resultant solution were added 10 mg of $Ce(CH_3COCHCOCH_3)_3$ prepared as in Example 6 and solutions (3), (4), (5) and (7) in Table 1 in a nitrogen atmosphere and these were well stirred and mixed to obtain the aqueous composition of this invention.

Said aqueous composition was spray coated on a rusted steel plate and this plate was left to stand in the air. Immediately, gelation of the coating film began and the film was hardened in several minutes. When this was further left to stand in the air, a coated plate having a red crosslinked film was obtained.

EXAMPLE 12

0.5 part by weight of methacroylacetone polymer having a molecular weight of about 10,000 was dissolved in 50 parts of dioxane. Thereafter, while blowing nitrogen thereinto, 0.4 part of trivalent cerium acetate and 1.0 part of a 20% aqueous solution of pyridine were added and this was kept at 60° C. for 2 days to obtain a chelate polymer which had a molecular weight of about 140,000 and was coordinated to cerium. This polymer was separated and its infrared absorption spectrum was measured. There were absorption bands characteristic of a chelate ring structure at $1580 \text{ cm}^{-1}$, $1518 \text{ cm}^{-1}$ and $420 \text{ cm}^{-1}$.

Nitrogen in a sufficient quantity was bubbled into a mixed solution comprising 10 parts of water, 1.0 part of acrylamide, 1.0 part of methylenebisacrylamide (0.1 M aqueous solution), 0.2 part of acrylic acid and 0.2 part of pyridine and then 1.0 ml of solution (7) in Table 1 and 0.005 part of the chelate polymer obtained above were added and these were well mixed to obtain the composition of this invention. This composition was spray coated on a steel plate and this plate was left to stand in the air to obtain a hardened film.

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. An aerobic composition free of peramides, hydroperoxides, persulfates and peroxides, which is stable in the absence of oxygen and polymerizes upon coming in contact with oxygen and which consists essentially of;
   (A): at least one compound selected from (1) trivalent cerium compounds and (2) chelated trivalent cerium compounds,
   (B): when (A) is (1) a compound capable of forming a chelate with trivalent cerium ion and with tetravalent cerium ion and when (A) is (2), a compound capable of forming a chelate with tetravalent cerium ion,
   (C): at least one sulfur compound selected from the group consisting of SO, $SO_2$, $S_2O$, sulfuryl chloride, dichloromonosulfane, dichloropolysulfanes, sulfoxylic acid, sulfurous acid, dithionous acid, pyrosulfurous acid, pyrosulfuric acid, dithionic acid, trithionic acid, tetrathionic acid, pentathionic acid, hexathionic acid, sulfinic acids, and the sodium, potassium and ammonium salts of said acids, (D): at least one polymerizable vinyl compound having a molecular weight of not more than 1000, and (E): an aqueous medium capable of dissolving or dispersing components (A)–(D).

2. The composition of claim 1, wherein component (E) is water.

3. The composition of claim 1, wherein component (E) is a mixture of water and at least one organic solvent.

4. The composition of claim 1, wherein component (E) is an aqueous medium containing water soluble or water dispersible polymer.

5. The composition of claim 1, wherein component (E) contains an electron-pair donating compound or mixtures thereof.

6. The composition of claim 1, wherein component (A) is trivalent cerium chelate polymer containing the repeating unit represented by formula (I) as its essential unit and optionally containing additionally the repeating unit represented by formulas (II) or (III), wherein said formulas are:

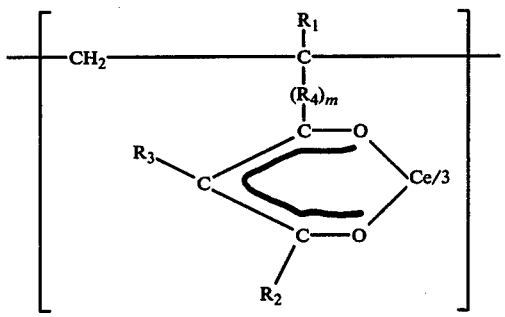 (I)

wherein $R_1$ is a hydrogen atom, a methyl group or a carboxyl group; $R_2$ is an alkyl group of 1–8 carbon atoms, a cycloalkyl group of 5–8 carbon atoms, an alkoxy group of 1–8 carbon atoms, or a tolyl group: $R_3$ is H, F, Cl, Br, I, CN, an acyl group or an alkyl group of 1–2 carbon atoms: $R_4$ is $-CH_2-$, $-O-$, $-C_6H_4-$ or $-C_6H_4CH_2-$, and m is an integer such that $0 \leqq m \leqq 2$;

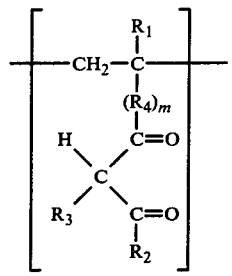 (II)

wherein $R_1$, $R_2$, $R_3$, $R_4$ and m are defined above; and

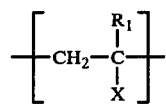 (III)

wherein $R_1$ is H, $CH_3$ or COOH: X is a nitrile group, an amido group, $-(CH_2)_m-COOR_5$, a phenyl group, a halogen, an ether group, an aminoalkyl group or a sulfoalkyl group wherein $R_5$ is H, an alkyl group of 1–18 carbon atoms and m is an integer such that $0 \leqq m \leqq 2$.

7. The composition of claim 6, wherein component (A) is a cerium chelate polymer containing 3–90% by weight of the repeating unit represented by formula (I), 7–90% by weight of the repeating unit represented by formula (II) and optionally up to 90% by weight of the repeating unit represented by formula (III).

8. The composition of claim 6, wherein $R_1$ is H or $CH_3$; $R_2$ is an alkyl group of 1–8 carbon atoms, a phenyl group or an alkoxy group of 1–8 carbon atoms; $R_3$ is H or an alkyl group of 1–2 carbon atoms, and m is 0 in the repeating units represented by formulas (I) and (II) of components (A); and X is $-(CH_2)_m COOR_4$ or a phenyl group wherein m is 0 and $R_4$ is an alkyl group of 1–18 carbon atoms in the repeating unit represented by formula (III).

9. A method for polymerizing at least one polymerizable vinyl compound having a molecular weight of not more than 1000 in the absence of peramides, peroxides, persulfates and hydroperoxides in an aqueous medium which consists essentially of incorporating into said medium (A): at least one compound selected from (1) trivalent cerium compounds and (2) chelated trivalent cerium compounds, (B): when (A) is (1) a compound capable of forming a chelate with trivalent cerium ion and with tetravalent cerium ion and when (A) is (2), a compound capable of forming a chelate with tetravalent cerium ion, (C): at least one sulfur compound selected from the group consisting of SO, $SO_2$, $S_2O$, sulfuryl chloride, dicloromonosulfane, dichloropolysulfanes, sulfoxylic acid, sulfurous acid, dithionous acid, pyrosulfurous acid, pyrosulfuric acid, dithionic acid, trithionic acid, tetrathionic acid, pentathionic acid, hexathionic acid, sulfinic acids and the sodium, potassium and ammonium salts of said acids, wherein said aqueous medium is capable of dissolving or dispersing components (A)–(C) and said vinyl compound; and exposing the mixture to oxygen.

* * * * *